Dec. 11, 1934.    H. C. WALTER ET AL    1,983,718
ELECTRIC POWER GENERATING MACHINE
Filed Nov. 17, 1932    3 Sheets-Sheet 1
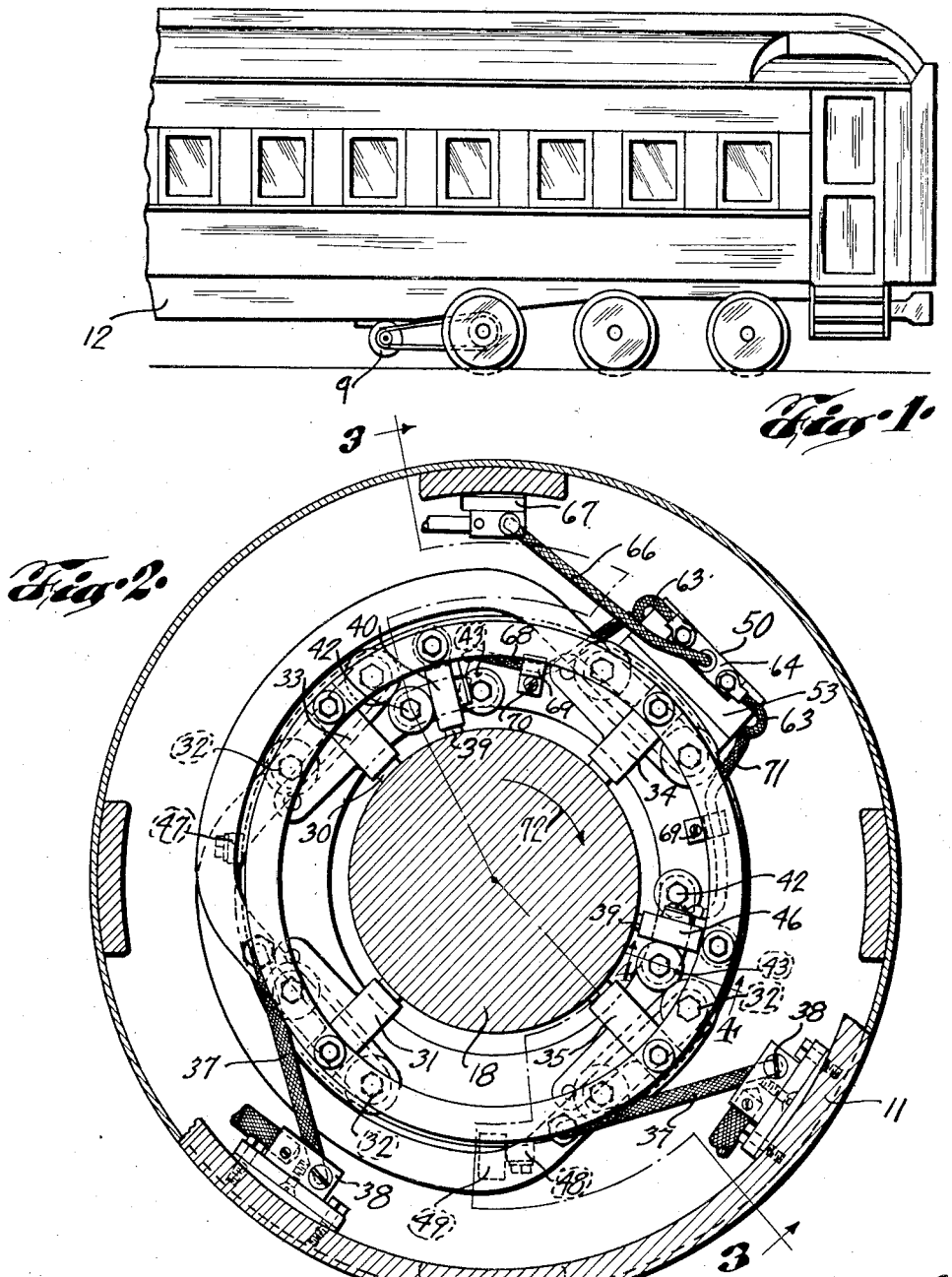
INVENTORS
HENRY C. WALTER
WILLIAM L. NIES
BY
Ray W Files
ATTORNEY.

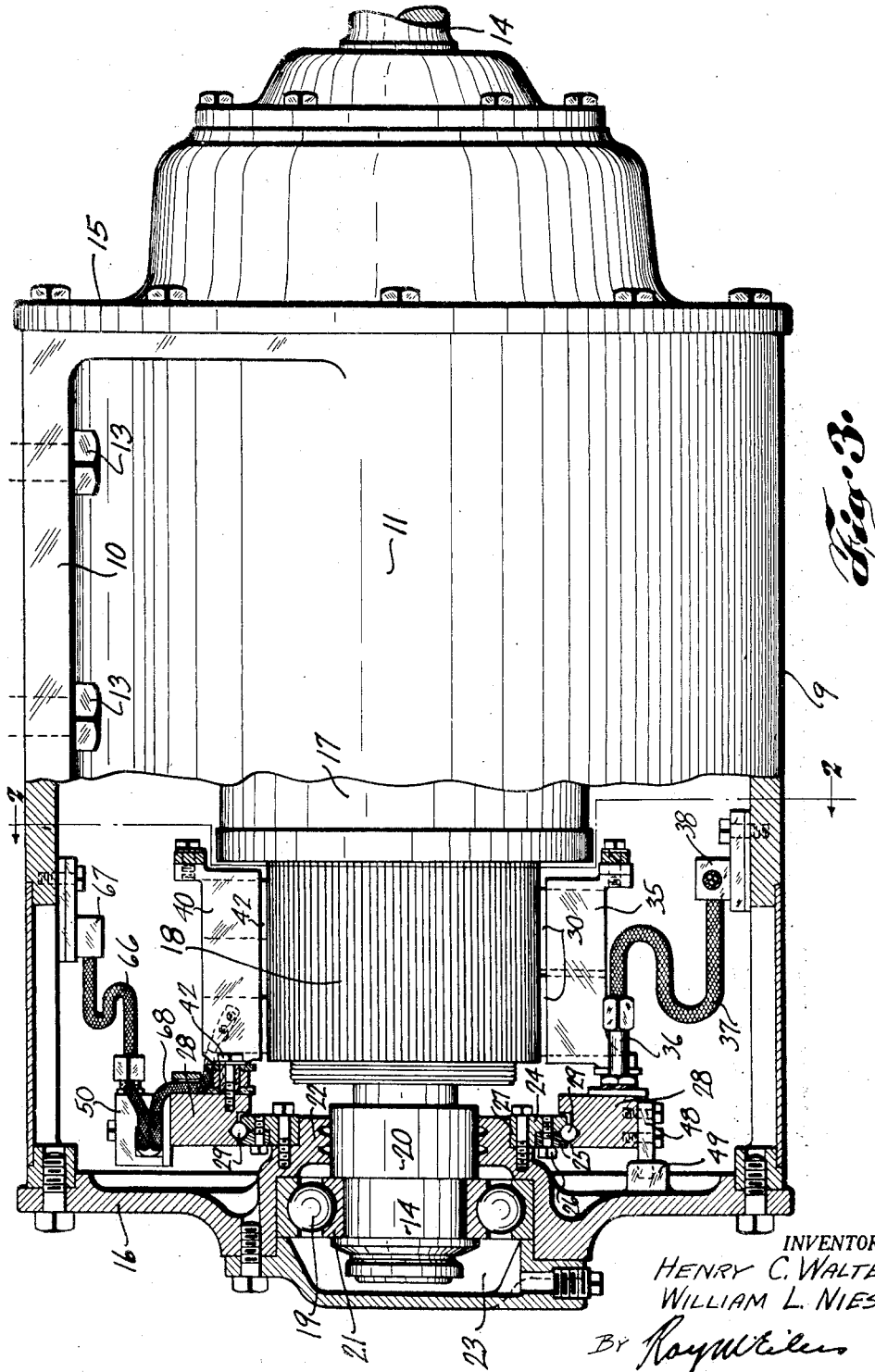

Dec. 11, 1934.   H. C. WALTER ET AL   1,983,718
ELECTRIC POWER GENERATING MACHINE
Filed Nov. 17, 1932   3 Sheets-Sheet 3
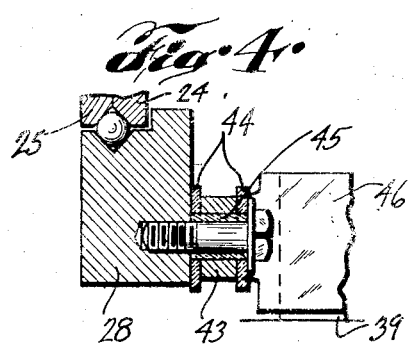
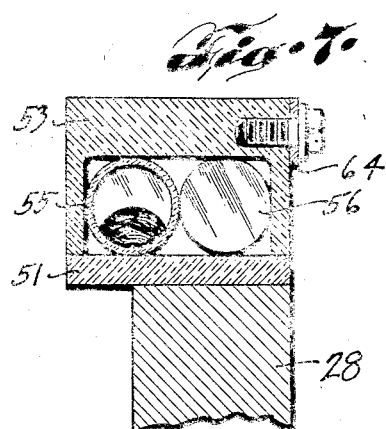
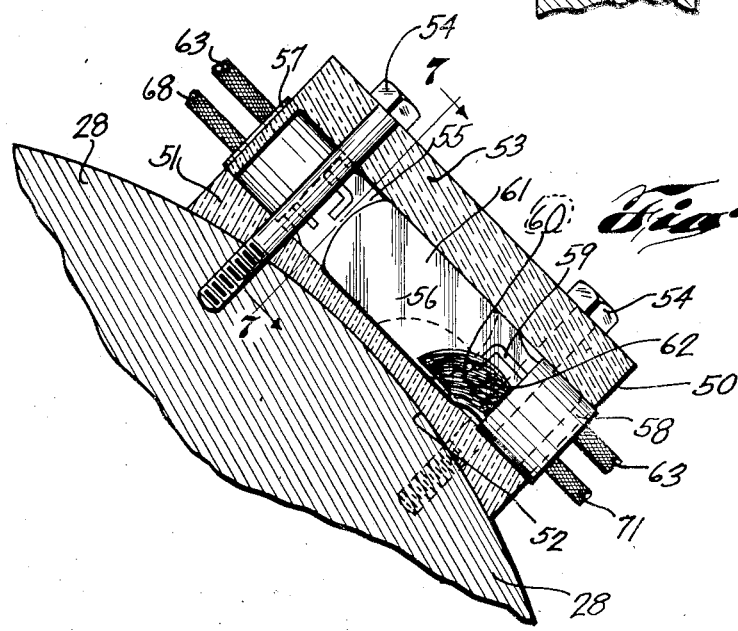
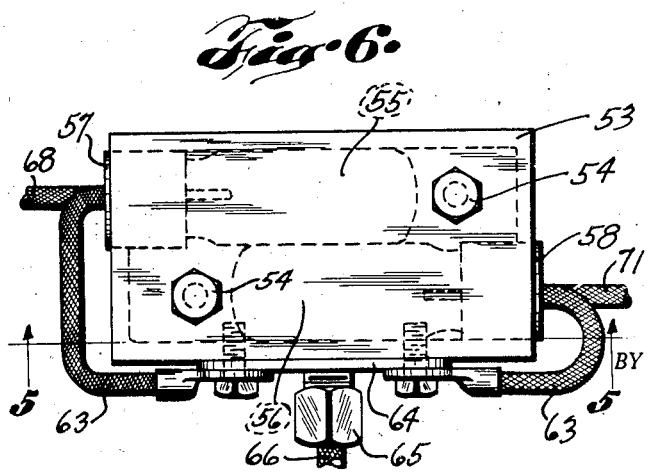
INVENTORS
HENRY C. WALTER
WILLIAM L. NIES
BY
ATTORNEY.

Patented Dec. 11, 1934

1,983,718

UNITED STATES PATENT OFFICE 1,983,718

ELECTRIC POWER GENERATING MACHINE

Henry C. Walter, Beloit, Wis., and William L. Nies, Chicago, Ill., assignors to Fairbanks, Morse & Co., Chicago, Ill., a corporation of Illinois Application November 17, 1932, Serial No. 643,067

5 Claims. (Cl. 171—318)

This invention relates to improvements in electric power generating machines, and more particularly to improvements in the construction of dynamo electric machines employed as a source of energy for supplying the usual electrical requirements of railway coaches.

In electrical systems in prevalent use on railway cars, it is usual to supply current for car lighting purposes, from a secondary battery connected to an axle driven generator provided with main brushes, and provided with means for angularly displacing the main brushes through a predetermined electrical angle, so as to maintain a unidirectional generator current output, irrespective of changes in the direction of movement of the car, and hence in the direction of rotation of the generator. The systems heretofore in prevalent use, employed an ordinary direct current generator, a voltage regulator of somewhat elaborate type, and required a complicated charging panel to provide for the requisite automatic and manual control of the system. It is, therefore, a principal object of the present invention to eliminate elaborate generator control apparatus, and to provide an improved generator, for supplying the power needs of railway coaches, which is entirely automatic in its operation to maintain a unidirectional current output, irrespective of the direction of movement of the car.

A further object is attained in the provision of an improved generator assembly for railway car use, in which the automatic control of the generator output, responsive to reversal of generator rotation, is affected by the arrangement of the generator brushes. This object may be more specifically stated, in connection with the example of the present disclosure, as attained in a structure including, in circuit relation, a generator of a type employing main brushes, and selectively interposed third brushes.

A still further object is attained in the combination with a generator, of an automatic mercury switch control for selectively connecting the third brushes into the generator circuit, responsive to changes in the direction of movement of the railway car with which the generator is used.

Further objects will appear as the description proceeds, and from the drawings appended hereto, and forming a part of the specification. In the drawings:

Fig. 1 is a fragmentary longitudinal elevation of a railway coach with certain parts removed to show a generator of a type and construction presently to be disclosed herein, mounted beneath the car frame and adapted to be driven from one of the car axles; Fig. 2 is a sectional elevation of the improved generator as taken along line 2—2 in Fig. 3; Fig. 3 is a side elevation of the generator, partly in section, the section being taken along line 3—3 in Fig. 2; Fig. 4 is a somewhat enlarged fragmentary sectional detail of a third brush holder mounting, as taken along line 4—4 in Fig. 2; Fig. 5 is an enlarged longitudinal sectional elevation of a mercury switch assembly employed in the generator circuit, and as viewed along line 5—5 in Fig. 6; Fig. 6 is a plan view of the switch assembly seen in Fig. 5, and Fig. 7 is a sectional end elevation of the switch as taken along line 7—7 in Fig. 5.

Referring now by characters of reference to the drawings, 9 represents, generally, a generator containing improvements according to the present invention. A flange portion 10 preferably integral with the generator frame 11, is provided as a means for mounting the generator to the under side of the car frame 12, as by bolts 13. The generator, which is of a third brush type arranged to be driven from one of the railway car axles, consists of the usual shaft 14 journalled in bearing arms 15 and 16, the arm 15 being on the generator drive side and the arm 16 on the commutator side, as shown in Fig. 3. Mounted on the shaft 14 is an armature 17 and a commutator 18. As will be noted, the shaft is preferably mounted in ball bearings, one of which is shown at 19, and a shaft enlargement 20 is provided to form a shoulder for the inner bearing race 21, and in conjunction with a portion 22 of the bearing arm 16 forms an oil seal to prevent oil, from the bearing 19 and oil chamber 23, reaching the surface of the commutator and consequently affecting efficient generator operation.

Since railway coaches are designed to, and customarily operate in either direction, the generator must, therefore, be adapted to operate in either direction of rotation. Furthermore, since the generator is generally employed to charge storage cells used for lighting, in addition to its use for supplying power to car equipment, the polarity of output must be the same in either direction of generator rotation. This is accomplished in the present invention by an improved third brush generator having an automatic brush-shifting device for maintaining a fairly constant output over a wide generator speed range, and also insuring a constant polarity of output.

To accomplish automatic shifting of the brushes with change in the direction of generator rotation, the brushes are preferably secured to a shiftable frame mounted on ball bearings, substantially as illustrated in Fig. 3. The inner or stationary bearing race consists preferably of a pair of ring members 24 and 25, the member 25 being secured to the member 24 by any suitable means, such as by bolts 26, and the member 24 secured in a seat 27 in the bearing arm portion 22. The brush-carrying frame 28, rotatable on the ball bearings 29, carries paired main brushes 30, in a suitable holder 31 secured to the frame, preferably by bolts 32 suitably insulated from the frame. As shown in Fig. 2 there are preferably four of these brush holders 31, 33, 34 and 35, or two pairs 31—34 and 33—35, since those diametrically opposite each other are electrically connected by a suitable conductor (not shown). One holder of each pair of brushes is equipped with a terminal 36, to which is electrically connected one end of a flexible conductor 37, the other end thereof being secured to a stationary terminal 38 on the frame 11, whence connection may be made into the generator circuit. The brushes and holders may be of any type suitable to be employed in third brush generators.

Third brushes 39 are each held in a holder 40, which is secured to the member 28, as by bolts 42 extending through holder lug portions 43, the holder being insulated from the bolt and member 28, by suitable insulating strips 44 and sleeve 45 of fiber or any other well known insulating material. As will be noted in Fig. 2, the brush holder 40 is positioned between main brush holders 33 and 34, the position being determined according to the characteristics of the generator. A similar third brush assembly 46 is mounted on the frame 28 between main brushes 34 and 35, but it is to be understood that only one third brush set is in operation at any given time and for a given direction of generator rotation, as will presently appear.

In order to maintain a constant polarity of the generator output irrespective of direction of generator rotation, the main brushes, as well as the third brushes, must be moved, with change in direction of rotation, to a predetermined position so as to effect proper generator action. Since the frame 28, carrying the brushes, is freely rotatable within limits, the frictional contact of the brushes upon the commutator surface is sufficient to accomplish the desired brush shifting movement as the generator armature rotation reverses. The range of shifting movement of the brushes and carrying frame is limited by lugs 47 and 48, spaced on the member 28 to provide the desired angle of shift, the lugs serving selectively to engage a stop 49, preferably made integral with the bearing arm 16.

The selective operation of the third brush assemblies is controlled by a novel switch arrangement generally designated at 50 in Fig. 2. The switch consists of a base member 51, having an arcuate face 52 adapted to seat on a portion of the circumferential face of the brush-carrying frame 28, and preferably adjacent to the main brush holder 34. A switch cover 53 is held on the base 51 by bolts 54, which extend into the member 28 to secure the base, as well as the cover, to the member 28. Between the base and the cover are mounted a pair of mercury switches 55 and 56, and which may be of so-called mercoid type, or of any other suitable design in which a circuit is completed by a conducting liquid, such as mercury, the switches illustrated being of single pole type. As will be noted in Fig. 6, the base portion 57 of switch 55 is at one end of the switch holder, and the base portion 58 of switch 56, at the opposite end so that the paired switches are relatively endwise reversed. In each switch a pair of terminals 59 and 60 are mounted in the base portion, and extend within the glass mercury case 61 having a quantity of mercury 62 therein. One terminal 59 of each switch is electrically connected, by means of a flexible lead 63, to a connector plate 64, having thereon a terminal post 65 to which is electrically connected, one end of a flexible lead 66, the other end thereof being secured to a generator circuit terminal 67 mounted on the generator frame 11. The contact terminal 60 of switch 55 is connected with the third brush holder 40, and hence the third brushes 39, by a flexible lead 68, fastened to the member 28 at its ends by a clamp 69, fastened to the member 28 by any suitable means such as a screw 70. Similarly, the contact terminal 60 of switch 56 is connected to the third brush assembly 46 as by a lead 71. When the switches are in the position shown in Figs. 2 and 5, the switch 56 is closed by reason of its tilted position with respect to the horizontal axis of the generator allowing the free mercury 62 to flow to the lower end of the switch, thus completing the circuit of the third brush assembly 46. Upon a change in the direction of the generator armature rotation, the brush carrier frame 28 and brushes are shifted to the opposite extreme position, as determined by the lug stop 47, and in this position the switch 56 opens and switch 55 closes, completing the circuit to the third brush assembly 40.

The operation of the improved generator is such that while the railway car is travelling in one direction, the generator rotation is, therefore, in a corresponding direction, and the main and third brushes are consequently carried to one extreme of their movement by the frictional engagement of the brushes on the commutator surface. For example, if the generator rotation is in the direction as shown by the arrow 72 in Fig. 2, the brushes, frame 28, and mercury switch 50 are rotated until the stop pin 48 on the shiftable frame 28, strikes the stop lug 49 on the bearing arm 16. With the generator secured in its intended or normal relation to the car frame, the terminal 67 is uppermost in Fig. 2, and since the mercury switches, as employed here, are entirely dependent upon gravity for their operation, they are, therefore, secured to the member 28, so as to lie at a substantial angle to the horizontal. Thus, according to the present example, the switch 56 will be closed, and the switch 55 in open position, with the parts as in Fig. 2. Since switch 56 controls the third brush assembly 46, that brush will now be placed in operative relation in the generator circuit. A reversal of generator rotation, responsive to a change in the direction of movement of the railway car, will carry the frame 28, and hence the brushes and switch assemblies to the opposite operating position, in which instance the switch 56 will be opened, and third brush 46 rendered inoperative, after which the switch 55 will be closed and the third brush 40 introduced to the generator circuit. As will be understood by those skilled in the art, the shifting of the main brushes responsive to change in direction of car movement, and hence reversal of generator rotation, is to maintain a constant polarity of generator output. This is particularly important since the generator is employed to charge the usual railway car storage battery units, in addition to its use for other power purposes. Likewise, upon reversal of generator rotation, as a result of change in direction of car movement, a shifting of the third brush must occur in order to retain the influence of the third brush connection upon the generator field, to maintain a substantially constant voltage output over a fairly wide generator speed range. In the present example, the third brush shift is accomplished by a change from one third brush unit, active only in one direction of generator rotation, to a similar unit properly related in the generator circuit and operative only in the reverse direction of generator rotation.

It will be noted that the presently disclosed combination of a third brush generator and mercury switches selectively controlling the third brushes, results in a generating unit which is durable and certain in its operation. The mercury switches are of particularly rugged construction, and require little or no attention, since the switch contacts are enclosed and sealed in a strong glass tube, eliminating any possibility of dust or dirt particles reaching the contacts to impair switch operation, as frequently occurs with switches of open mechanical construction in which the contacts are exposed to the air. The enclosed feature of the third brush change-over switches is particularly important where the switches are to be used on railway car equipment, as in the present case, since the cars are subjected to all weather conditions, and since generators of the type described are usually mounted beneath the car, and subjected to dust, particles of gravel etc., agitated from the road bed by the movement of the car thereover.

The invention, as herein set forth, is described with reference to a single embodiment thereof, and it is to be understood that substantial alterations may be made without departing from the full intended scope of the invention, as defined by the appended claims.

We claim:

1. In an electric power system for a railway car, a reversible generator including a generator circuit, an enclosing frame including a removable closure plate at one end constituting a bearing arm, a ring structure detachably secured to the inner face of the closure plate, a commutator, main brushes, and a pair of third brushes, a brush carrier of annular form mounted on said ring structure, and arranged to be moved by friction of the brushes with the commutator through definite arcs, and a mercury switch assembly consisting of two elongated tube switch units, mounted together in endwise reversed relation, and operable, upon reversal of generator rotation, to connect either of said third brushes into the generator circuit to the exclusion of the other thereof, to maintain a constant direction of current output, the switch assembly including an enclosed switch mounting element secured to the peripheral portion of the carrier, the switch assembly, brushes and carrier being removable from the generator as an assembled unit upon disconnection of the brush and switch leads.

2. In combination with an electric generator of reversible type and a circuit therefor, an armature, a commutator, an enclosing frame, a removable closure forming a bearing arm at one end of the frame, an annular projection internally of the closure, main brushes and a pair of third brushes, an annular carrier member for said brushes shiftably mounted on said annular projection, and arranged to be rotated by friction of the brushes with said commutator through definite arcs responsive to change in direction of armature rotation, a pair of single pole switches of elongate tube mercury type, mounted together in endwise opposed relation on a peripheral portion of said carrier member along the plane of its shifting movement, one switch being in circuit with each of said third brushes, said switches being adapted separately to maintain said third brushes in said generator circuit, a housing for the switches, stops fixing the limits of the shifting movement of the carrier, the stops being located on the closure as to establish end positions of the switches substantially away from the horizontal, a terminal mounted on said frame and connected into the generator circuit, a terminal on said switches, and a flexible lead connecting said terminals, whereby to permit rotation of said carrier member.

3. In combination, in a reversible direct current generator of the third brush type including a commutator, a pair of main brushes, and a pair of third brushes angularly spaced from each other, a carrier for said brushes arranged to be shifted by friction of the brushes with the commutator, an enclosing casing or frame for the generator having a removable bearing arm at one end, an arcuate seat projecting internally of the bearing arm, on which the carrier is shiftably mounted, and with which the carrier and brush assembly is removable as a unit, paired single pole switches of mercury type and elongate form, mounted together in endwise opposed relation on the peripheral portion of said carrier, with their axes transverse to the axis of the machine, a holder substantially enclosing the switches, the holder and switches being removable from the generator with the brush and carrier assembly, stops for the brush carrier adapted to limit its angular movement, said stops being so disposed on the stationary portions of the generator, as to establish limits of switch movement at opposite sides of a vertical axial plane through the generator, a terminal disposed on the stationary portions of the generator, a companion terminal on said switches, and a flexible lead connecting said terminals.

4. In a reversible direct current generator, an enclosing frame or casing, a removable end plate on the frame, an armature, a commutator, main brushes and a plurality of third brushes, a bracket carried by the end plate within the frame, a brush carrier shiftably mounted on the bracket and arranged to be moved by friction of the brushes with the commutator in opposite directions of armature rotation, a mercury type switch in controlling relation with a third brush circuit and adapted to be positioned in circuit closing relation responsively to rotation of the armature in one direction, a companion switch of mercury type adapted to be positioned in circuit opening relation during rotation of the armature in the same direction, a protective housing enclosing said switches, and in which they are mounted in parallel, endwise reversed relation parallel to the path of shifting movement of the carrier and adjacent the periphery thereof, and means detachably clamping said housing and switches to said carrier.

5. In a direct current generator of reversible type, an enclosing frame or casing having removable end plates, an armature, a commutator, main brushes and a pair of selectively effective third brushes, a brush carrier internally of one end of the frame, a projection internally of one end plate, ball bearings by which the carrier is mounted for shifting movement upon said projection, by friction of the brushes with the commutator in either direction through definite arcs, a pair of mercury type switches of elongate form, one in circuit with each of said third brushes, a protective insulating housing in which the switches are mounted in endwise reversed relation parallel to the plane of shifting movement of the carrier, and means detachably securing said housing and switches to the periphery of said carrier, the frictional movement of said carrier being adapted to change the position of said brushes and to vary the inclination of said switches, to render effective one of said brushes and render inoperative the other thereof, the brushes, carrier, switches and switch housing being removable as a unit with the adjacent end plate.

WILLIAM L. NIES.
HENRY C. WALTER.